United States Patent
Xiao et al.

(10) Patent No.: US 11,030,048 B2
(45) Date of Patent: Jun. 8, 2021

(54) METHOD A SOURCE STORAGE DEVICE TO SEND A SOURCE FILE AND A CLONE FILE OF THE SOURCE FILE TO A BACKUP STORAGE DEVICE, A SOURCE STORAGE DEVICE AND A BACKUP STORAGE DEVICE

(71) Applicant: Huawei Technologies Co., Ltd., Shenzhen (CN)

(72) Inventors: Jianlong Xiao, Chengdu (CN); Keji Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1121 days.

(21) Appl. No.: 15/459,984

(22) Filed: Mar. 15, 2017

(65) Prior Publication Data
US 2017/0192849 A1  Jul. 6, 2017

Related U.S. Application Data

(63) Continuation of application No. PCT/CN2015/096358, filed on Dec. 3, 2015.

(51) Int. Cl.
*G06F 16/16* (2019.01)
*G06F 11/14* (2006.01)
(Continued)

(52) U.S. Cl.
CPC ........ *G06F 11/1446* (2013.01); *G06F 16/113* (2019.01); *G06F 16/16* (2019.01);
(Continued)

(58) Field of Classification Search
CPC .................. G06F 11/1446; G06F 16/2322
See application file for complete search history.

(56) References Cited

U.S. PATENT DOCUMENTS 6,829,617 B2  12/2004  Sawdon et al.
8,055,864 B2  11/2011  Sawdon et al.
(Continued)

FOREIGN PATENT DOCUMENTS

CN  101206595 A  6/2008
CN  101743546 A  6/2010
(Continued)

OTHER PUBLICATIONS

Sawant, "7-Mode SnapMirror Async Overview and Best Practices Guide," Technical Report, TR-3446, XP55382521A, pp. 1-73, NetApp Inc. (Mar. 2013).
(Continued)

*Primary Examiner* — Eliyah S. Harper
(74) *Attorney, Agent, or Firm* — Leydig, Voit & Mayer, Ltd.

(57) ABSTRACT

A method for a source storage device to send a source file and a clone file of the source file to a backup storage device. The source storage device sends a data block to the backup storage device to be stored as a target file. Then, the source storage device determines that the source file is associated with the clone file by searching a cloning recorder with a source file ID of the source file. Based upon the determining, the source storage device sends a clone creating request including the source file ID to the backup storage device to instruct the backup storage device to create a clone file of the target file. Thus, the method is capable of replicating the clone file of the file without sending a large number of mapping data.

28 Claims, 9 Drawing Sheets

(51) Int. Cl.
*G06F 16/178* (2019.01)
*G06F 16/23* (2019.01)
*G06F 16/27* (2019.01)
*G06F 16/2455* (2019.01)
*G06F 16/11* (2019.01)
*G06F 16/174* (2019.01)

(52) U.S. Cl.
CPC ........ *G06F 16/178* (2019.01); *G06F 16/1752* (2019.01); *G06F 16/235* (2019.01); *G06F 16/2322* (2019.01); *G06F 16/24562* (2019.01); *G06F 16/273* (2019.01); *G06F 2201/84* (2013.01)

(56) References Cited

U.S. PATENT DOCUMENTS

| | | | |
|---|---|---|---|
| 8,738,570 B2* | 5/2014 | Picken | G06F 16/16 707/626 |
| 9,116,913 B2 | 8/2015 | Fukatani et al. | |
| 9,223,500 B1* | 12/2015 | Lemar | G06F 3/0641 |
| 9,323,758 B1* | 4/2016 | Stacey | G06F 16/1748 |
| 2003/0079918 A1* | 5/2003 | Eyre | E21B 10/5735 175/432 |
| 2005/0246503 A1* | 11/2005 | Fair | G06F 16/10 711/147 |
| 2012/0278553 A1 | 11/2012 | Mudhiganti et al. | |
| 2013/0268493 A1 | 10/2013 | Berman et al. | |
| 2013/0290248 A1* | 10/2013 | Fukatani | G06F 16/184 707/610 |
| 2015/0032982 A1* | 1/2015 | Talagala | G06F 3/0619 711/162 |
| 2015/0052112 A1* | 2/2015 | Shimizu | G06F 16/1748 707/692 |
| 2016/0077756 A1 | 3/2016 | Raj et al. | |
| 2016/0246814 A1* | 8/2016 | Picken | G06F 16/162 |
| 2017/0192849 A1* | 7/2017 | Xiao | G06F 16/113 |
| 2018/0013579 A1* | 1/2018 | Fairweather | H04L 12/40032 |

FOREIGN PATENT DOCUMENTS

| | | |
|---|---|---|
| CN | 102955861 A | 3/2013 |
| CN | 103218276 A | 7/2013 |
| CN | 103221924 A | 7/2013 |
| CN | 103365744 A | 10/2013 |
| CN | 103620580 A | 3/2014 |
| CN | 103890738 A | 6/2014 |
| CN | 104254853 A | 12/2014 |
| CN | 105045685 A | 11/2015 |
| WO | WO 2014130035 A1 | 8/2014 |

OTHER PUBLICATIONS

Reddy, "Using FlexClone to clone Files and LUNs," Technical Report, TR-3742, XP55382525A, pp. 1-28, NetApp Inc. (Sep. 2011).

Rodeh, "The Write-Anywhere-File-Layout (WAFL)," PowerPoint, XP55382786A, pp. 1-36, (Nov. 24, 2015).

Gilani et al., "Deploying and Managing a Cloud Infrastructure; Real World Skills for the CompTIA Cloud+™ Certification and Beyond," XP55383323A, ProQuest Ebook Central, John Wiley & Sons, Inc., Canada (2005).

* cited by examiner

METHOD A SOURCE STORAGE DEVICE TO SEND A SOURCE FILE AND A CLONE FILE OF THE SOURCE FILE TO A BACKUP STORAGE DEVICE, A SOURCE STORAGE DEVICE AND A BACKUP STORAGE DEVICE

CROSS-REFERENCE TO RELATED APPLICATIONS

This application is a continuation of International Application No. PCT/CN2015/096358, filed on Dec. 3, 2015, the disclosure of which is hereby incorporated by reference in its entirety.

TECHNICAL FIELD

The present disclosure relates to a remote technology, especially related to sending a source file and a clone file of the source file to a backup storage device, a source storage device and a backup storage device.

BACKGOUND ART

In today's technological era, businesses and government entities are increasingly reliant upon high performance computing and storage systems. As part of safeguarding critical data, the effects of a disaster must be considered. A natural disaster such as a flood or earthquake, or a technical disaster such as a major computer failure, could render a storage system useless, and thus the data it contains non-accessible or destroyed. Remote replication storage systems have been employed to circumvent this unacceptable possibility.

In a remote replication storage system, data is stored as usual at a local site where applications normally execute. Another storage system is deployed at a remote site (possibly many miles away but not always necessary). All or at least a portion of the data stored at the local site is also copied to the remote site. Thus, if a disaster occurs at the local site, the data, at least up to a point in time, can be recovered at the remote site. In some situations, the storage device of the local site may have a file system. Data (also called data block) can be organized as a file. Especially, some files have their clone files, which are modifiable copies of the files. The local site sends both files and their clone files to the remote site to ensure that the remote site has the same files and their clone files and thus is able to take over the business. One approach is replicating the data blocks included in the file. However, in order to let the remote site store the clone file of the file, the local site further sends an inode number of the source file, an inode number of the clone file of the source, pointer data indicating the relationship between the two inode numbers, and block pointer data mapping the clone file with each data block to the remote site. The huge amount of data may increase load of the storage system in a limited bandwidth environment.

SUMMARY

With regards to the prior art, if the local site is required to send the file and its clone file to the remote site, not only the data blocks included in the file, but also an inode number of the source file, an inode number of the clone file of the source, pointer data indicating the relationship between the two inode numbers, and block pointer data mapping the clone file with each data block need to be sent to the remote site. It may increase load of the storage system in a limited bandwidth environment.

The present disclosure was devised in consideration of the above-described circumstances and aims at suggesting a source storage device and a backup storage device and remote replication method capable of replicating the clone file of the file without sending pointer data indicating the relationship between the inode number of the source file and the inode number of the clone file, and block pointer data mapping the clone file with each data block.

In a first aspect, present application provides a method for sending a source file and a clone file of the source file to a backup storage device. The source storage device includes a processor and one or more disks for storing files. The source file includes a data block and a first block pointer pointing to the data block, and the clone file of the source file includes a second block pointer pointing to the data block. The processor sends the data block to the backup storage device to be stored as a target file. The target file includes a first block pointer to the data block. Then, the processor determines that the source file is associated with the clone file by searching a cloning recorder with a source file ID of the source file. The cloning recorder includes IDs of files each associated with an ID of a corresponding clone file. Based upon the determining, the processor sends a clone creating request including the source file ID to the backup storage device to instruct the backup storage device to create a clone file of the target file. After the backup storage device receives the clone creating request, the backup storage device creates a clone file of the target file based upon the source file ID. The clone file of the target file includes a second block pointer pointing to the data block.

By determining that the source file is associated with the clone file, the processor sends a clone creating request to the backup storage device to instruct the backup storage device to create a clone file of the target file. Since the clone creating request only includes the source file ID, the method is capable of replicating the clone file of the file without sending redundant data to the backup storage device. For example, pointer data indicating the relationship between the inode number of the source file and the inode number of the clone file, and block pointer data mapping the clone file with each data block.

According to a first implementation of the method according to the first aspect, the clone creating request further includes an ID of the clone file of the source file. The processor of the source storage device further receives message in response to the clone creating request. The message includes an ID of the clone file of the target file. And the ID of the clone file of the target file is identical to the ID of clone file of the source file. Thus, it is easy for source storage device to be aware of which file is the clone file of the target file stored in the backup storage device.

With reference to the first implementation, in a second implementation of the method according to the first aspect, the processor determines that the source file has been updated after the clone file of the source file is created. Then, the processor sends first update data of the source file to the backup storage device after receiving the message. The first update data which is used to update the source file is written into the source storage device after the clone file of the source file in the source storage device is created. Thus, if the source file has been updated after the clone file of the source file is created, the update data can be sent to the backup storage device to update the target file. Accordingly, the target file can be kept consistency with the source file.

With reference to the first implementation, in a third implementation of the method according to the first aspect, the processor determines that the clone file of the source file has been updated after the clone file of the source file is created. Then, the processor sends second update data to the backup storage device after receiving the message. The second update data which is used to update the clone file of the source file is written into the source storage device after the clone file of the source file in the source storage device is created. Thus, if the clone file of the source file has been updated after the clone file of the source file is created, the update data can be sent to the backup storage device to update the clone file of the target file. Accordingly, the clone file of the target file can be kept consistency with the clone file of the source file.

In a second aspect, present application provides a method for a backup storage device to backup a source file and a clone file of the source file. The backup storage device includes a processor and one or more disks for storing a plurality of files. The processor receives a data block of the source file from the source storage device and stores the data block as part of a target file. The target file includes a first block pointer pointing to the data block. Then, the processor receives a clone creating request including a source file ID of the source file from the source storage device. After that, the processor creates a clone file of the target file based upon the source file ID. The clone file of the target file includes a second block pointer pointing to the data block.

By receiving a clone creating request including a source file ID of the source file from the source storage device, the processor of the backup storage device creates a clone file of the target file based upon the source file ID. Since the clone creating request only includes the source file ID, the method is capable of replicating the clone file of the file without sending redundant data to the backup storage device. For example, pointer data indicating the relationship between the inode number of the source file and the inode number of the clone file, and block pointer data mapping the clone file with each data block.

According to a first implementation of the method according to the second aspect, the processor receives the source file ID from the source storage device and allocates a target file ID for the target file. The target file ID is identical to the source file ID. The processor specifically determines that it is the target file who needs to be created a clone file based on the source file ID and creates the clone file of the target file. Thus, it is easy for source storage device to be aware of which file stored in the backup storage device corresponds to the source file stored in the source storage device.

With reference to the first implementation, in a second implementation of the method according to the second aspect, the backup storage device further includes a log area. The processor further receives first update data and the source file ID from the source storage device. Based upon the source file ID, the processor determines that the first update data is used to update the target file. The first update data is written into the source storage device after the clone file of the source file in the source storage device is created. The processor writes the first update data into the log area. When determining that the data block has been written into the target file, the processor obtains the first update data from the log area and writes the first update data into the target file. After that, the processor modifies the second block pointer to point to the first update data. According to the implementation of the method, the target file can be kept consistency with the source file, when the source file is updated. Further, since the first update data is written into the log area first instead of writing into the target file directly, the clone file of the target file can keep consistency with the clone file of the source file.

With reference to the first implementation, in a third implementation of the method according to the second aspect, the clone creating request further includes an ID of a clone file of the source file. The processor further allocates an ID of the clone file of the target file. The ID of the clone file of the target file is identical to the ID of the clone file of the source file. Thus, the clone file of the target file can be easily found based on the ID of the clone file of the source file.

With reference to the third implementation, in a fourth implementation of the method according to the second aspect, the backup storage device further includes a log area. The processor further receives second update data and the ID of the clone file of the source file from the source storage device. Then, the processor determines that the second update data is used to update the clone file of the target file based upon the ID of the clone file of the source file. The second update data is written into the source storage device after the clone file of the source file in the source storage device is created. The processor further writes the second update data into the log area. After that the processor determines that the data block has been written into the target file. Based upon the determination, the processor obtains the second update data from the log area, and writes the second update data into the clone file of the target file. At last, the processor modifies the second block pointer to point to the second update data. According to the implementation of the method, the clone file of the target file can be kept consistency with the clone file of the source file, when the clone file of the source file is updated. Further, since the second update data is written into the log area first instead of writing into the clone file of the target file directly, the target file can keep consistency with the source file.

In a fifth implementation of the method according to the second aspect, the backup storage device receives the source file ID from the source storage device, and allocates a target file ID for the target file. The target file ID is different from the source file ID. The backup storage device then stores a file mapping relationship between the source file ID and the target file ID. The backup storage device can determine that it is the target file who needs to be created a clone file based on the first mapping relationship and create the clone file of the target file. As the target file ID is different from the source file ID, it is more flexible than the implementation that the target file ID is identical to the source file ID.

With reference to the fifth implementation, in a sixth implementation of the method according to the second aspect, the backup storage device further includes a log area. The processor receives first update data and the source file ID from the source storage device. Then, the processor determines that first update data is used to update the target file based upon the source file ID and the first mapping relationship. The first update data is written into the source storage device after the clone file of the source file in the source storage device is created. The processor writes the first update data of the target file into the log area. After that, the processor determines that the data block has been written into the target file. Based upon the determination, the processor obtains the first update data from the log area and writes the first update data into the target file. At last, the processor modifies the second block pointer to point to the first update data. According to the implementation of the method, the target file can be kept consistency with the source file, when the source file is updated. Further, since the first update data is written into the log area first instead of writing into the target file directly, the clone file of the target file can keep consistency with the clone file of the source file.

With reference to the fifth implementation, in a seventh implementation of the method according to the second aspect, the clone creating request further includes an ID of a clone file of the source file. The processor allocates an ID of the clone file of the target file, which is different from the ID of the clone file of the source file. And then, the processor stores a second mapping relationship between the ID of the clone file of the source file and the ID of the clone file of the target file. As the ID of the clone file of the target file is different from the ID of the clone file of the source file, it is more flexible than the implementation that t the ID of the clone file of the target file is identical to the ID of the clone file of the source file.

With reference to the seventh implementation, in a eighth implementation of the method according to the second aspect, the backup storage device further includes a log area. The processor further receives second update data and the ID of the clone file of the source file from the source storage device. Then, the processor determines that the second update data is used to update the clone file of the target file based upon the ID of the clone file of the source file and the second mapping relationship. The second update data is written into the source storage device after the clone file of the source file in the source storage device is created. The processor further writes the second update data into the log area. After that the processor determines that the data block has been written into the target file. Based upon the determination, the processor obtains the second update data from the log area, and writes the second update data into the clone file of the target file. At last, the processor modifies the second block pointer to point to the second update data. According to the implementation of the method, the clone file of the target file can be kept consistency with the clone file of the source file, when the clone file of the source file is updated. Further, since the second update data is written into the log area first instead of writing into the clone file of the target file directly, the target file can keep consistency with the source file.

In a third aspect, present application provides a source storage device performing the method in the first aspect.

In a fourth aspect, present application provides a backup storage device performing the method in the second aspect.

In a fifth aspect, present application provides a source apparatus performing the method in the first aspect.

In a sixth aspect, present application provides a backup apparatus performing the method in the second aspect.

In a seventh aspect, the disclosure relates to a computer program comprising a program code for performing the method according to the first aspect when executed on a computer. Thus, the method can be performed in an automatic and repeatable manner.

In a eighth aspect, the disclosure relates to a computer program comprising a program code for performing the method according to the second aspect when executed on a computer. Thus, the method can be performed in an automatic and repeatable manner.

DESCRIPTION OF EMBODIMENTS

An embodiment of the present disclosure will be explained in detail with reference to the attached drawings.

(1) Hardware Configuration of Storage System

Figure 1:
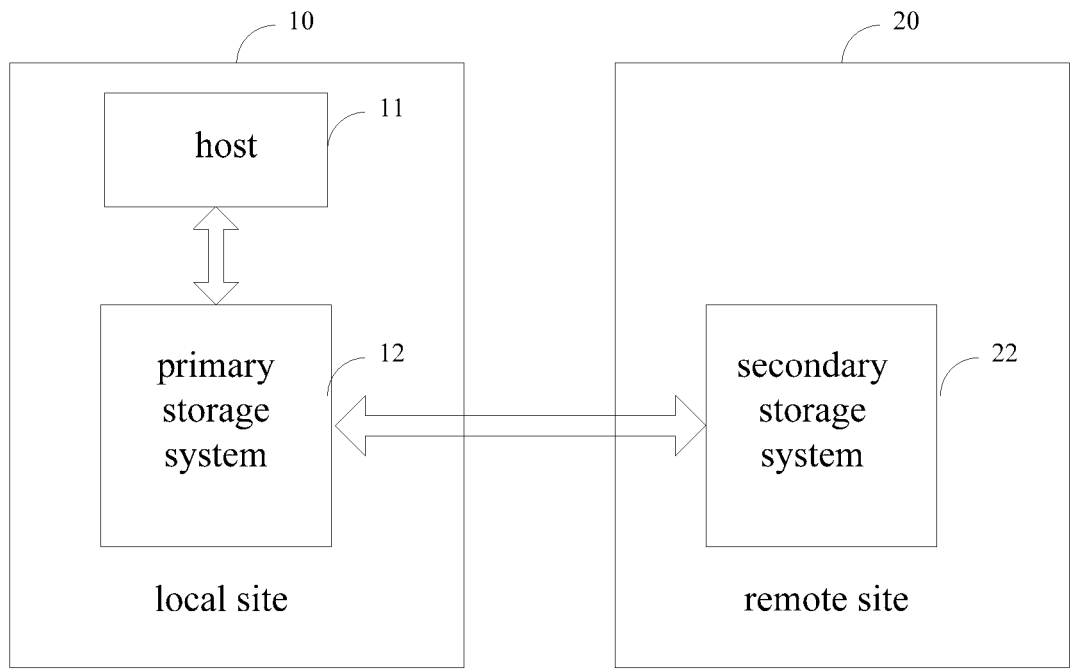
FIG. 1 is a block diagram illustrating a hardware configuration of a storage system according to an embodiment of the present disclosure.

Firstly, a hardware configuration of a storage system will be described. FIG. 1 is a block diagram illustrating the hardware configuration of the storage system. As depicted in FIG. 1, the storage system includes a local site 10 and a remote site 20. The local site 10 at least includes a host 11 and a primary storage system 12. The host 11 executes one or more applications that transfer data to and from the primary storage system 12. The primary storage system 12 ensures that all or at least a portion of data is copied to the remote site 20. The remote site 20 is preferably geographically remote from the local site 10 in order to ensure that it will not be affected in the event of a disaster. After a disaster, applications on the host 11 may recover and restart using the application data restored by the local site 10 from the remote site 20. However, people skilled in the art would appreciate that, as an example, the remote site 20 also can be deployed in a same location with the local site 10, or a location near the local site 10.

Figure 2A:
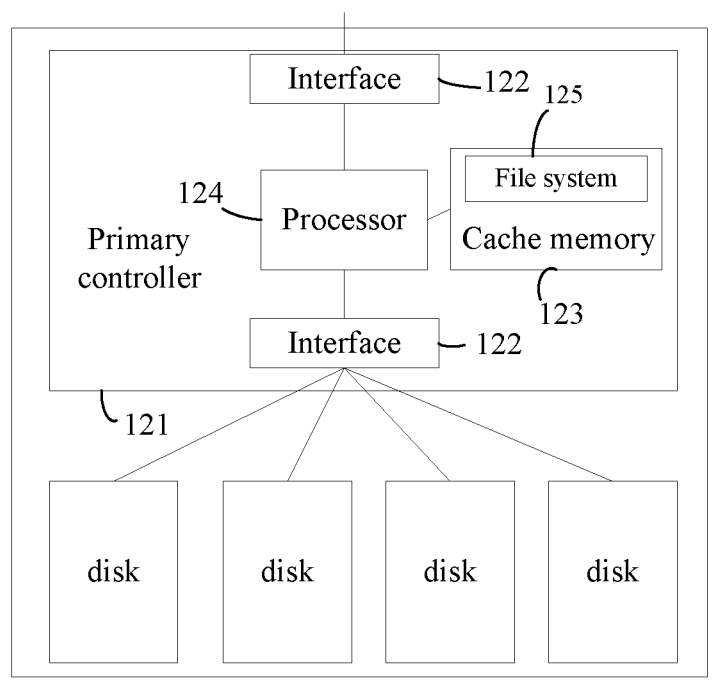
FIG. 2A is a block diagram illustrating a hardware configuration of a primary controller according to an embodiment of the present disclosure.

The primary storage system 12 of FIG. 1 may be a disk array which includes a primary controller 121. FIG. 2A depicts a hardware configuration of the primary controller 121. The primary controller 121 includes one or more interfaces 122 through which it communicates and exchanges data with the host 11, the disks, and a secondary storage system 22. The primary controller 121 further includes a cache memory 123 for storing executing instructions and all kinds of programs. Further, the primary controller 121 includes a processor 124 for executing instructions stored in the memory 123. As will be described below, the processor 124 performs some steps in FIG. 7 or FIG. 8.

Figure 2B:
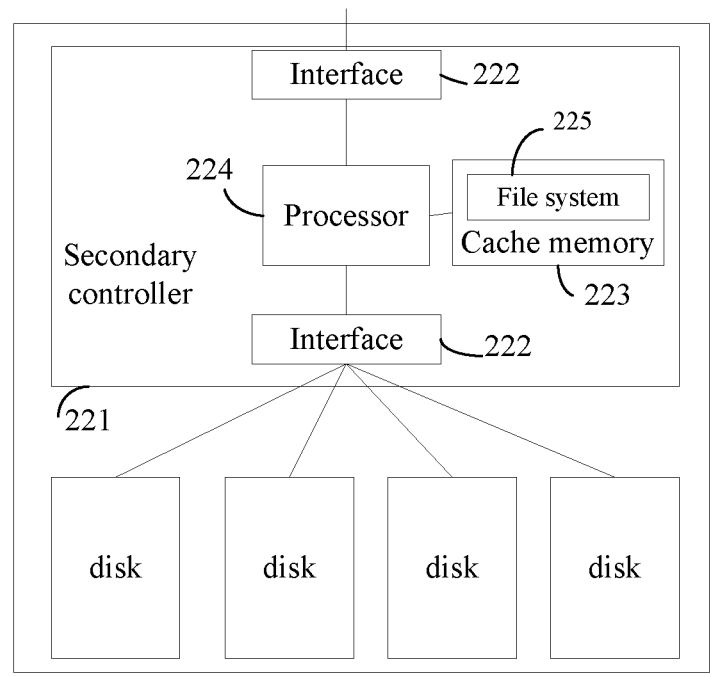
FIG. 2B is a block diagram illustrating a hardware configuration of a secondary controller according to an embodiment of the present disclosure.

The primary storage system 12 further includes one or more hard disk drives (indicated as disks in FIG. 2A, and FIG. 2B). The hard disk drive is composed of semiconductor memories such as Solid State Drive (SSD), expensive and high-performance disk devices such as Serial Attached SCSI (SAS) disks or Fibre Channel (FC) disks, and inexpensive and low-performance disk drives such as Serial AT Attachment (SATA) disks. Furthermore, a plurality of hard disk drives can be managed as one RAID group.

As depicted in FIG. 2B, the secondary storage system 22 has the same hardware configuration as the primary storage system 12. For example, the secondary storage system 22 includes a secondary controller 221 and one or more disks. The secondary controller 221 includes one or more interfaces 222 through which it communicates and exchanges data with the disks and primary storage system 12. The secondary controller 221 further includes a cache memory 223 for storing executing instructions and programs. Further, the secondary controller 221 includes a processor 224 for executing instructions and programs stored in the memory 223. As will be described below, the processor 124 performs some steps in FIG. 7 or FIG. 8. The disks of the secondary storage system 22 are similar to the disks of the primary storage system 12, and are not described again here. Further, the secondary storage system 22 includes a log area for recording logs of one or more data blocks of a file. The log area is a separated area in the cache memory 223 or disks of the secondary storage system 22.

(2) Software Configuration of Storage System

Firstly, the primary storage system 12 includes a file system 125. The file system 125 is used to control how data is stored and retrieved. Without a file system, information placed in a storage area (such as disks) would be one large body of data with no way to tell where one piece of information stops and the next begins. By separating the data into individual pieces, and giving each piece a name, the information is easily separated and identified. Taking its name from the way paper-based information systems are named, each group of data is called a "file". The structure and logic rules used to manage the groups of information and their names are called a "file system". Accordingly, the file system 125 is responsible for organizing files and directories, and keeping track of when the files have been modified. Further, the file system 125 stores all the metadata associated with the file—including the file name, file ID (for example, inode number), a size of the data blocks of a file, the location of the file stored in the disks, a timestamp of the file being created and multiple timestamps of data blocks being written into the disks.

Figure 3:
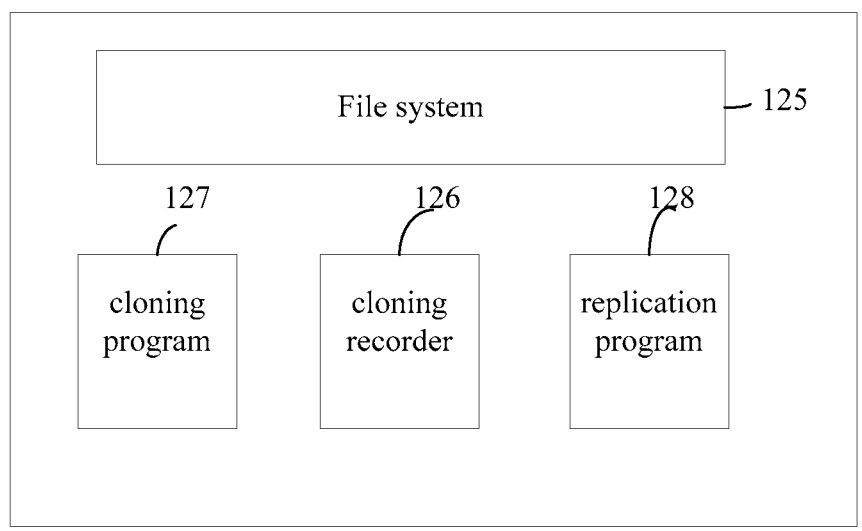
FIG. 3 is a block diagram illustrating a software configuration of a primary controller according to an embodiment of the present disclosure.

The file according to an embodiment of the present disclosure includes one or more data blocks and one or more block pointers. Each block pointer points to a data block. As shown in FIG. 3, the primary controller 121 further includes a cloning program 127, a cloning recorder 126, and a replication program 128 which may be stored in the memory 123.

Figure 4A:
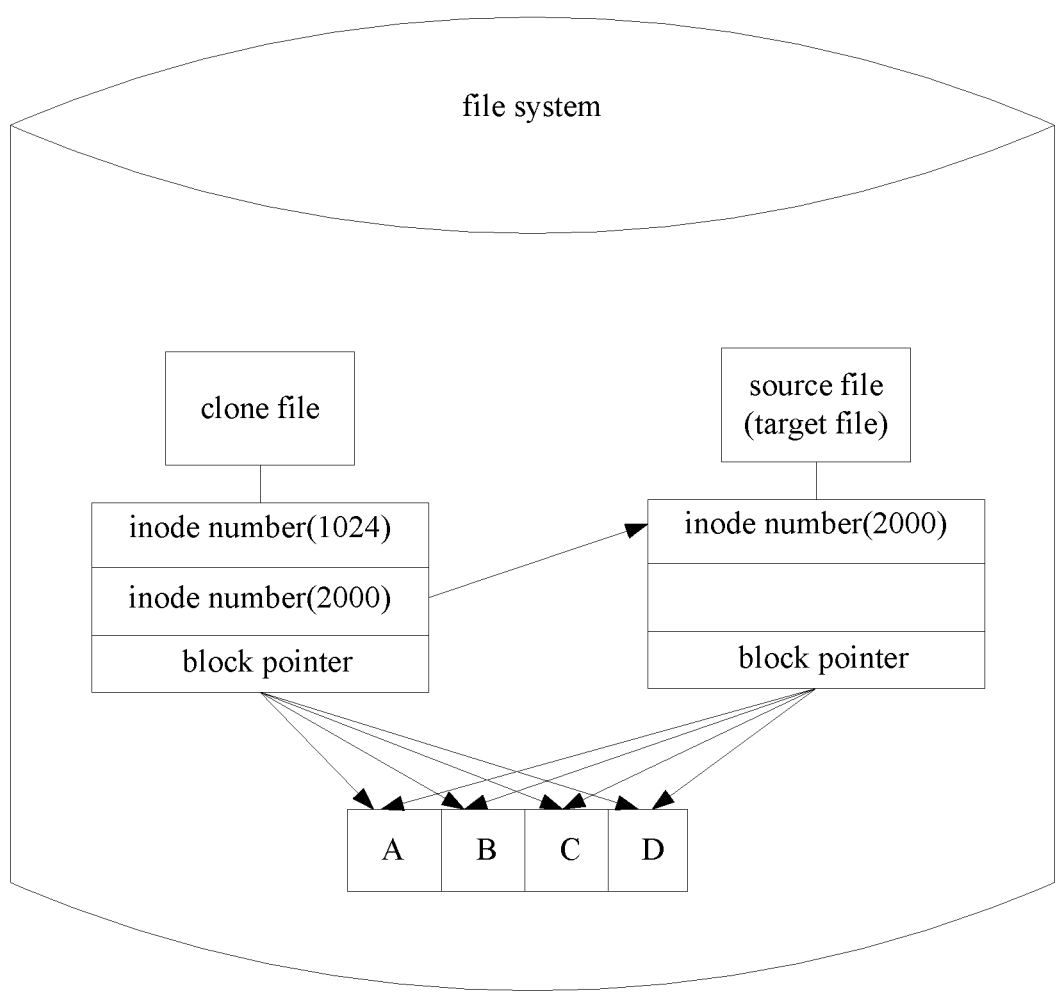
FIG. 4A is a block diagram illustrating how to create a clone file of a source file according to an embodiment of the present disclosure.

The cloning program 127 is a program for generating a clone file of a file. As depicted in FIG. 4A, a file (called a source file) has its clone file which is a modifiable copy of the file. The clone file of the source file to be replicated and the source file shares physical data blocks by including block pointers which are pointing to the same physical data blocks of the source file, such as A, B, C and D as shown in FIG. 4A. Further, a file can be identified by an inode number. And the inode number can also be deemed as a file ID. For example, the source file ID is 2000, while the clone file ID is 1024. If a file is a clone file of the source file, the source file ID should be recorded in the clone file as shown in FIG. 4A.

Figure 4B:
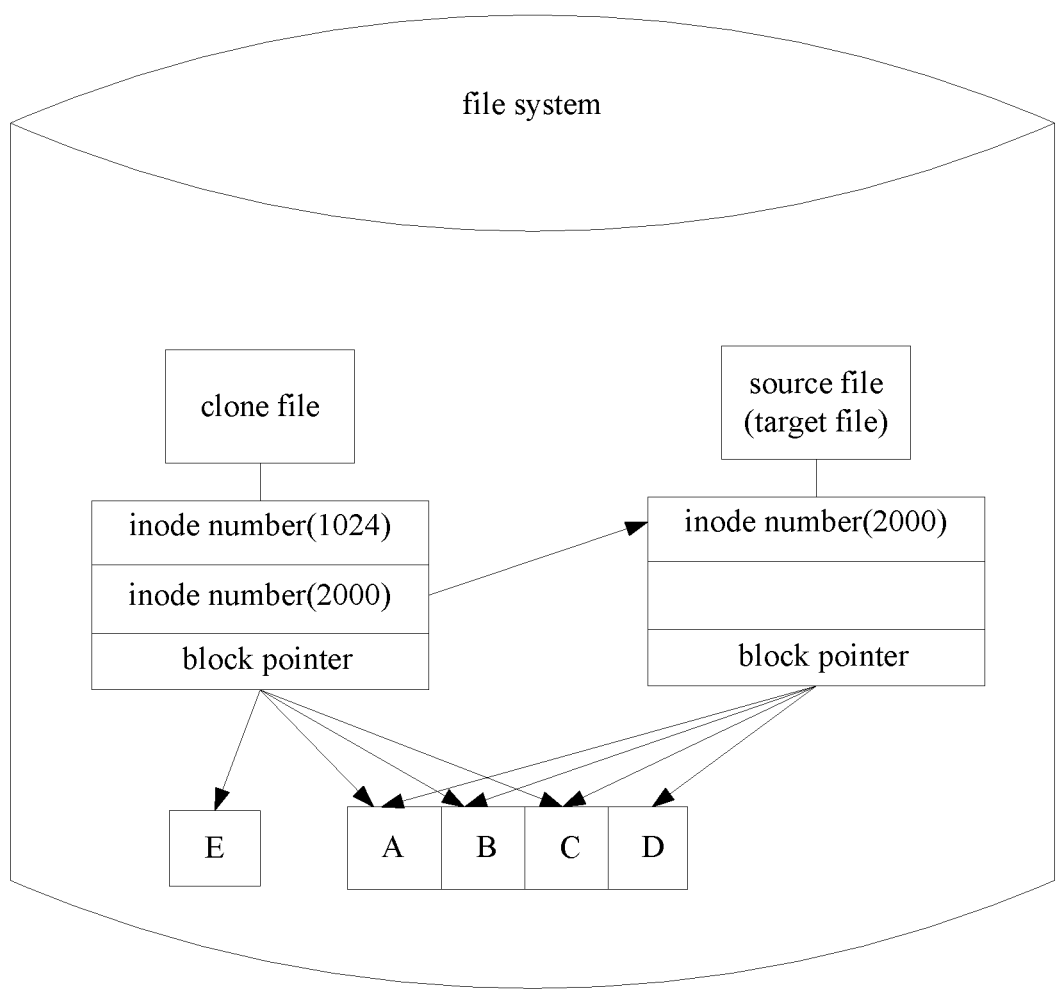
FIG. 4B is a block diagram illustrating how to modify the clone file of the source file according to an embodiment of the present disclosure.

As depicted in FIG. 4B, when the clone file is modified to replace data block D with a data block E which is stored in a different location. The block pointer of the clone file which is used to point to D is modified to be pointing to the data block E. Meanwhile, the block pointers of the source file are still pointing to A, B, C, and D. As such, the source file will not be modified.

Figure 4C:
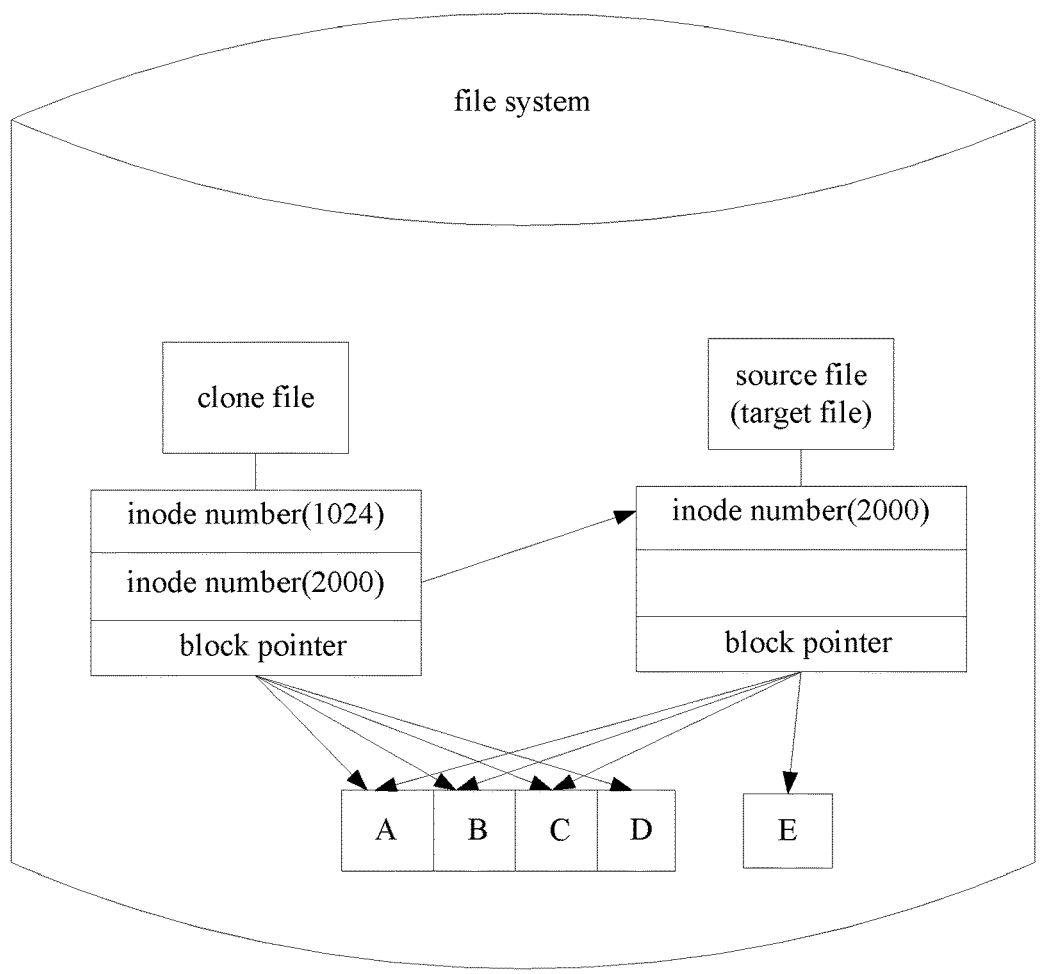
FIG. 4C is a block diagram illustrating how to modify the source file according to an embodiment of the present disclosure.

As depicted in FIG. 4C, when the source file is modified to replace data block D with data block E, the block pointer of the source file which is used to point to D is modified to be pointing to the data block E. Meanwhile, the block pointers of the clone file are still pointing to A, B, C, and D. As such, the clone file will not be modified.

Figure 5:
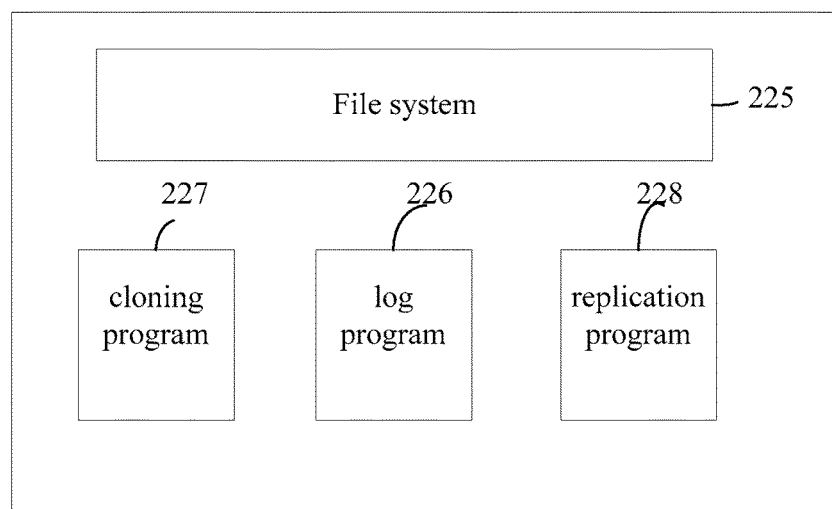
FIG. 5 is a block diagram illustrating a software configuration of a secondary controller according to an embodiment of the present disclosure.
Figure 6:
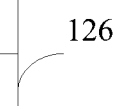
FIG. 6 is a block diagram illustrating a table included in a cloning recorder according to an embodiment of the present disclosure.

The cloning recorder 126 may include, but is not limited to, a table as shown in FIG. 5 for recording which files having a clone file and other information about cloning. Specifically, the table may include the source file ID, the clone file ID and timestamp indicating when the clone file was created.

The replication program 128 is a program responsible for replicating files stored in the primary storage system 12 to the secondary storage system 22. Specifically, when a backup task is triggered, the replication program 128 generates a file replication request which includes a source file ID of a source file to be replicated. If the source file has no clone file of it, the replication program 128 only need to send data blocks affiliating to the source file to the secondary storage system 22. After receiving the data blocks, the secondary storage system 22 stores the data blocks as a target file, which is identical to the source file. If the source file has a clone file, the replication program 128 notifies the secondary storage system 22 to create a clone file of the target file to ensure the data structure of the secondary storage system 22 is the same as the primary storage system 12.

Next, the software configuration of the secondary storage system 22 will be explained. As depicted in FIG. 5, the secondary storage system 22 at least includes file system 225, cloning program 227, log program 226 and replication program 228.

The file system 225 of the secondary storage system 22 is similar to the file system 125 of the primary storage system 12, and is not described again here.

The cloning program 227 of the secondary storage system 22 is similar to the cloning program 127 of the primary storage system 12. The way of creating a clone file of a target file is similar to the way of creating a clone file of a source file. The ways of modifying a source file or a clone file as shown in FIG. 4A, FIG. 4B and FIG. 4C are suitable for modifying a target file and its clone file.

The log program 226 is used to record one or more logs of one or more data blocks. Sometimes, some data blocks should not be written into the disks immediately, the log program 226 is responsible for writing these data blocks into a log area first. The log area is a separated area in the cache memory 223 or disks of the secondary storage system 22. Except for the data blocks, some log information should also be written into the log area, such as an ID of a file who owns the data blocks, sizes of the data blocks.

The replication program 228 is a program for receiving files from the primary storage system 12 and writing the received files into disks.

(3) File Backup Process

The file backup process can be performed in an asynchronous remote replication mode or a synchronous remote replication mode.

In the asynchronous remote replication mode, the files stored in the primary storage system 12 are replicated to the secondary storage system 22 over a plurality of periods. Each period corresponds to a replication task. And in each period, the primary storage system 12 sends one or more files to the secondary storage system 22 for backup.

In the synchronous remote replication mode, when the primary storage system 12 receives a file (which may comprise one or more data blocks) from the host 11, the primary storage system 12 may send the file to the secondary storage system 22 before notifying the host 11 that the file has been written. Accordingly, files in general stored in the primary storage system 12 are the same as data stored in the secondary storage system 22. However, if a link between the primary storage system 12 and the secondary storage system 22 fails, there are some files stored in the primary storage system 12 not being replicated to the secondary storage system 22. So in the case like that, the file backup process can also be performed in the synchronous remote replication mode.

Specifically, when the primary storage system 12 sends a file to the secondary storage system 22, it may send one or more file replication requests to the secondary storage system 22. Each file replication request includes one or more data blocks of the file. Further, the file replication request may include an ID of the file.

The following steps are performed by the processor 224 with the programs in FIG. 3 or the processor 224 with the programs in FIG. 5.

Figure 7:
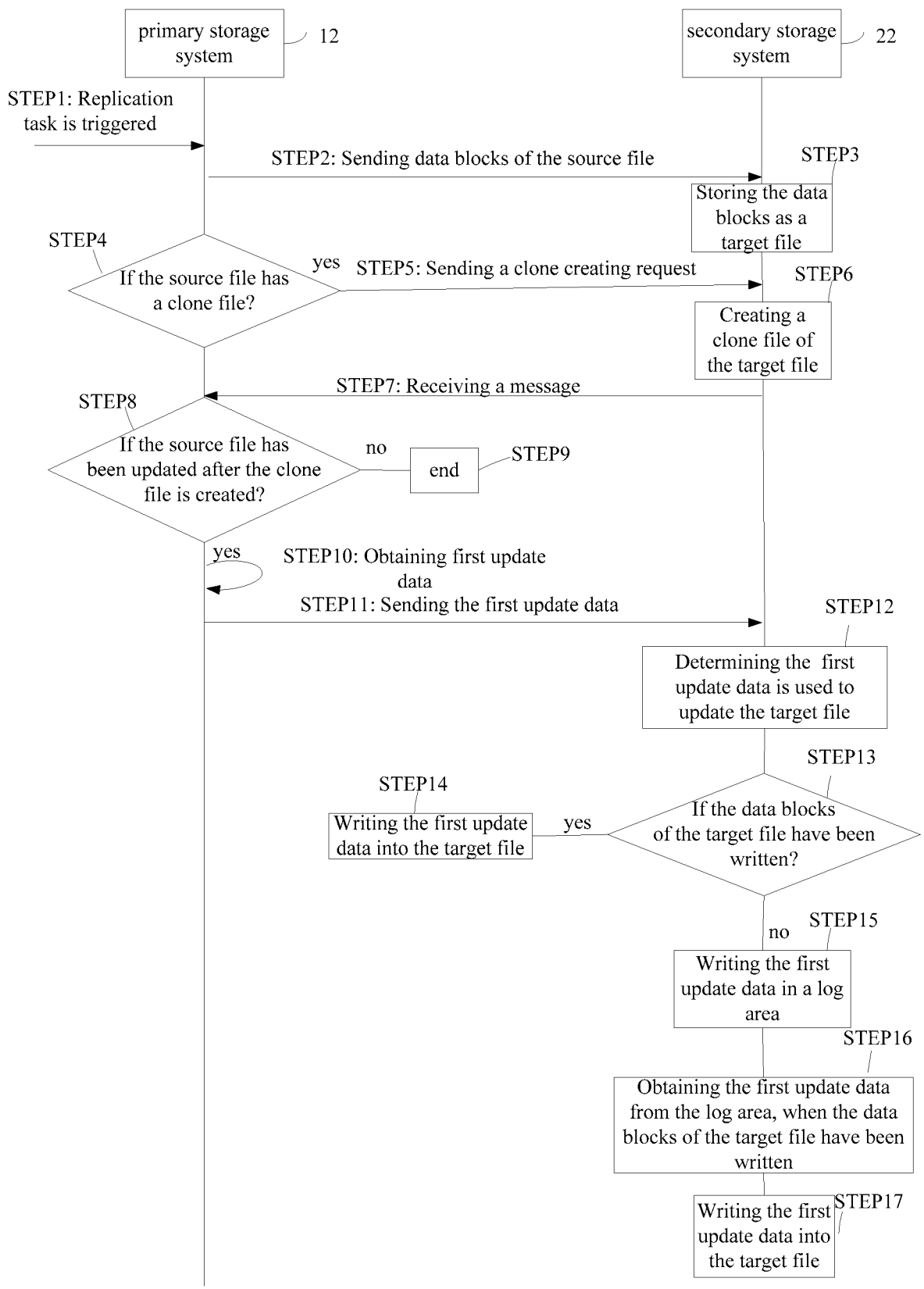
FIG. 7 is a block diagram illustrating a backup processing according to an embodiment of the present disclosure.

As depicted in FIG. 7, in STEP 1: the replication program 128 determines that a replication task is triggered. The replication task may be triggered by a timer, or triggered manually, which is not limited herein. In some cases, there may be an intermediate equipment between the local site 10 and the remote site 20. The intermediate equipment determines when the replication task starts and sends a notification to the local site 10 to trigger the replication task.

In STEP 2: the replication program 128 sends the data blocks of the source file to the secondary storage system 22.

Specifically, the replication program 128 may generate a file replication request which includes an ID of a file to be replicated. For example, the source file described above is the file to be replicated.

Further, the file replication request may include the source file ID. As an example, the replication program 128 may obtains the data blocks of source file directly and send them to the secondary storage system 22. As another example, when the replication task is triggered, files stored in the primary storage system 12 may be copied like a snapshot. The snapshot shows the state of the file system 125 at a particular point in time. It can refer to a copy of the state of the file system 125, so the data blocks of the source file can be obtained based on the snapshot.

In fact, there may be multiple file replication requests generated. Each file replication request includes one or more data blocks of the source file to be replicated. We just take a file replication request described in STEP 2 as an example to explain how to replicate the source file to the secondary storage system 22.

For example, the source file includes A, B, C and D as described in FIG. 4A. After receiving these data blocks by the secondary storage system 22, the replication program 228 of the secondary storage system 22 performs STEP 3: storing the data blocks as a part of a target file. As an example, the replication program 228 may allocate a target file ID which is identical to the source file ID so that the target file can be easily found. As another example, the replication program 228 may allocate a target file ID which is different from the source file ID. Further, the replication program 228 stores a first mapping relationship between the allocated target file ID and the source file ID. In this way, the target file can be found according to the source file ID and the first mapping relationship. In order to let the primary storage system 12 know which file stored in the secondary storage system 22 is identical to the source file, the replication program 228 of the secondary storage system 22 may send the first mapping relationship to the primary storage system 12 for storage.

In STEP 4: the replication program 128 determines whether the source file is associated with a clone file by searching the cloning recorder 126. As described above, the cloning recorder includes IDs of files each associated with an ID of a corresponding clone file. Accordingly, the cloning recorder indicates which file has a clone file. Specifically, it records a mapping relationship between a file ID and a clone file ID. Furthermore, the cloning recorder 126 records timestamp indicating when a particular clone file is created. The replication program 128 searches the cloning recorder with the source file ID. If a record is found, it indicates that the source file has a clone file. Otherwise, there is no clone file of the source file being created.

If it is determined in STEP 3 that the source file has a clone file, STEP 5 needs to be executed.

In STEP 5: the replication program 128 sends a clone creating request to the secondary storage system 22. The clone creating request may include the source file ID. If the target file ID in the secondary storage system 22 is identical to the source file ID in the primary storage system 12, the cloning program 227 will be aware of which file's clone file should be created based upon the source file ID. If the target file ID in the secondary storage system 22 is different from the source file ID in the primary storage system 12, the cloning program 227 will be aware of which file's clone file should be created based upon the source file ID and the first mapping relationship.

The clone creating request may further include an ID of the clone file of the source file. After a clone file of the target file is created by the cloning program 227 (STEP 6), the cloning program 227 may allocate the clone file of the target file an ID which is identical to the clone file ID. In another approach, the cloning program 227 may allocate the clone file of the target file an ID which is different from the ID of the clone file of the source file. The cloning program 227 may further store a second mapping relationship between the ID of clone file of the source file and the ID of clone file of the target file. In order to let the primary storage system 12 know which clone file stored in the secondary storage system 22 is identical to the clone file of the source file, the cloning program 227 of the secondary storage system 22 may send the second mapping relationship to the primary storage system 12 for storage.

More specifically, the process of creating the clone file of the target file will be explained. As depicted in FIG. 4A, the target file includes an inode number and block pointers. The inode number is the target file ID. When a clone file of the target file is created, a field indicating an inode number of the clone file is filled with the clone file ID. Then the inode number of the target file is also included in the clone file to indicate that the clone file is a clone file of the target file. The block pointers of the clone file are pointing to the data blocks which are also pointed by the block pointer of the target file.

In STEP 7: After the clone file of the target file is created, the cloning program 227 sends a message in response to the clone creating request. The message is used to notify the primary storage system 12 that the clone file of the target file has been created. For example, the message may include the ID of the clone file of the target file.

In prior art, the local site needs to send an inode number of the source file, an inode number of the clone file of the source, pointer data indicating the relationship between the two inode numbers, and block pointer data mapping the clone file with each data block to the remote site. The huge amount of data may increase load of the storage system in a limited bandwidth environment.

With the file backup process according to the embodiment as described above, both of the source file and its clone file stored in local site can be replicated to a remote site without transferring sending pointer data indicating the relationship between the inode number of the source file and the inode number of the clone file, and block pointer data mapping the clone file with each data block to the remote site. If the source file has a clone file, the local site only needs to send a clone creating request including the source file ID the remote site to instruct the remote site to create a clone file of the target file. Accordingly, the load of the storage system in a limited bandwidth environment is saved.

(4) Modified Source File Backup Process

In some cases, the source file may be modified after the clone file of the source file is created. According to the embodiment, the primary storage system 12 further needs to send update data (called first update data) to the secondary storage system 22. The secondary storage system 22 receives the first update data and uses it to update the target file. So the update data backup processing will be explained.

In the asynchronous remote replication mode, for example, the first update data can be obtained by comparing two snapshots. One snapshot is taken in the last replication period, the other snapshot is taken in the current replication period. While in the synchronous remote replication mode, the first update data may be received from the host 11 to update the source file.

In STEP 8, the replication program 128 determines whether the source file has been updated after the clone file of the source file being created. Since the cloning recorder 126 has recorded a timestamp indicating when the clone file of the source file is created. The replication program 128 obtains another timestamp from the file system 125 which indicates when the first update data is written in the primary storage system 12. So the replication program 128 can compare the two timestamps to determine whether the source file has been updated after the clone file of the source file being created. If no, the process will be end (STEP 9).

On the other hand, if it is determined in STEP 8 that the source file has been updated, the replication program 128 obtains the first update data (STEP 10) and sends it to the secondary storage system 22 (STEP 11). The first update data may be included in a replication request which further includes an offset of the first update data within the source file and a size of the first update data.

Further, in the STEP 11, the replication program 128 may attach an indicator to the first update data to make a distinction between the source file and the first update data. The indicator indicates that the first update data of the source file is written into the the primary storage system 12 (cache memory 123 or the disks) after the clone file of the source file is created.

In STEP 12: After the replication program 228 receives the first update data, it determines the first update data is used to update the target file. For example, the replication program 128 may send an update request to the replication program 228. The update request includes the first update data and the source file ID. Further, the first update data may be attached an indicator (explained in the STEP 11). Based upon the indicator, it is determined by the replication program 228 that the first update data is written into the primary storage system 12 after the clone file of the source file has been created. Further, in an approach, the target file ID is identical to the source file ID. The replication program 228 determines that it is the target file who needs to be updated by the first update data based upon the source file ID. In another approach, the target file ID is different from the source file ID. The replication program 228 determines that it is the target file who needs to be updated by the first update data based upon the source file ID and the first mapping relationship.

In STEP 13: The replication program 228 determines whether data blocks of the target file have been written into the target file of secondary storage system 22. According to the embodiment, if the replication program 228 receives a notification from the primary storage system 12, the replication program 228 may determine the data blocks of the target file have been written into the target file of the secondary storage system 22. The notification is used to notify the secondary storage system 22 that the all data blocks of the source file have been sent out.

People skilled in the art know that a file may include one or more data blocks. The data blocks may be included in one or more file replication requests. The replication program 128 sends the file replication requests to the replication program 228 successively. In some scenarios, when the replication program 228 has already received the first update data, some of the data blocks may have not yet been written into the secondary storage system 22. So the replication program 228 needs to determine whether the data blocks of the target file have been stored.

For example, after the replication program 128 sends a first data block of the source file to the secondary storage system 22, the replication program 228 receives the first data block and stores it as a part of the target file. And the replication program 228 sends a first response to the primary storage system 12. People skilled in the art would appreciate that the first response is sent after the first data block has been written into cache memory 223 of the secondary storage system 22 in write back mode. And the first response is sent after the first data block has been written into disks of the secondary storage system 22 in write through mode. Either in write back mode or in write through mode, the first response means that the first data block has been stored in the target file the secondary storage system 22. Then, the replication program 128 sends a second data block of the source file and receives a second response to the second data block from the secondary storage system 22. Accordingly, when the replication program 128 sends out all data blocks of the source file, the replication program 128 may receive the all responses from the secondary storage system 22. After that, the replication program 128 sends the replication program 228 the notification described above.

If the data blocks of the target file have been stored in the secondary storage system 22, the replication program 228 writes the first update data into the target file directly (STEP 14). Otherwise, the replication program 228 should activate the log program 226 and execute the STEP 15.

In the STEP 15: The log program 226 writes the first update data into the log area. For example, the log program 226 may write the first update data according to the attached indicator.

More specifically, the log program 226 records log of the first update data and write the log into the log area. The log includes the first update data itself. Further, the log includes the target file ID because the first update data is used to update the target file. And the log further includes an offset within the target file and a size of the first update data. Based on the offset and the size, it can be determined which block of the target file should be replaced by the first update data. It should be noted that the log area may be located in the disks or in the cache memory 223 of the secondary controller. If it is located in the disks, the log area should be separated from the area storing the data blocks of the target file.

Until determining that the data blocks of the target file have been written into the target file, STEP 16 could be executed. In STEP 16, the log program 226 obtains the first update data from the log area.

In STEP 17, the log program 226 writes the first update data into the target file. And then the data pointer pointing to a replaced block should be redirect to the first update data.

An example depicted in FIG. 4C, the update data E is supposed to replace data block D. Before the A, B, C and D are totally written in the disks, the log program 226 records a log of the update data E. The log of the update data E includes E, an offset within the target file (for example, 76) and a size of the update data E (for example, 25 byte). After the A, B, C and D are totally written in the disks, the log program 226 obtains E from the log area and writes it into the disks. Then the log program 226 further determines that which data block of the target file should be replaced by the update data E. The log program 226 obtains metadata of the target file from the file system 225. The metadata shows that a size of the target file is 100 byte. The data block D is located in an address range of 76-100. As such, the log program 226 can determine the data block D should be replaced by the update data E. So the log program 226 redirects the block pointer of D to the update data E.

With regard to the update data of source file backup processing according to the embodiment, the update data can be sent to the secondary storage device to update the target file without changing the clone file of the target file.

(5) Modified Clone File Backup Process

In other cases, the clone file of the source file may be modified after the clone file is created. According to the embodiment, the primary storage system 12 further needs to send update data (called second update data) to the secondary storage system 22. The secondary storage system 22 receives the second update data and uses it to update the clone file of the target file.

In the asynchronous remote replication mode, for example, the second update data can be obtained by comparing two snapshots. One snapshot is taken in the last replication period, the other snapshot is taken in the current replication period. While in the synchronous remote replication mode, the second update data may be received from the host 11 to update the clone file of the source file.

Figure 8:
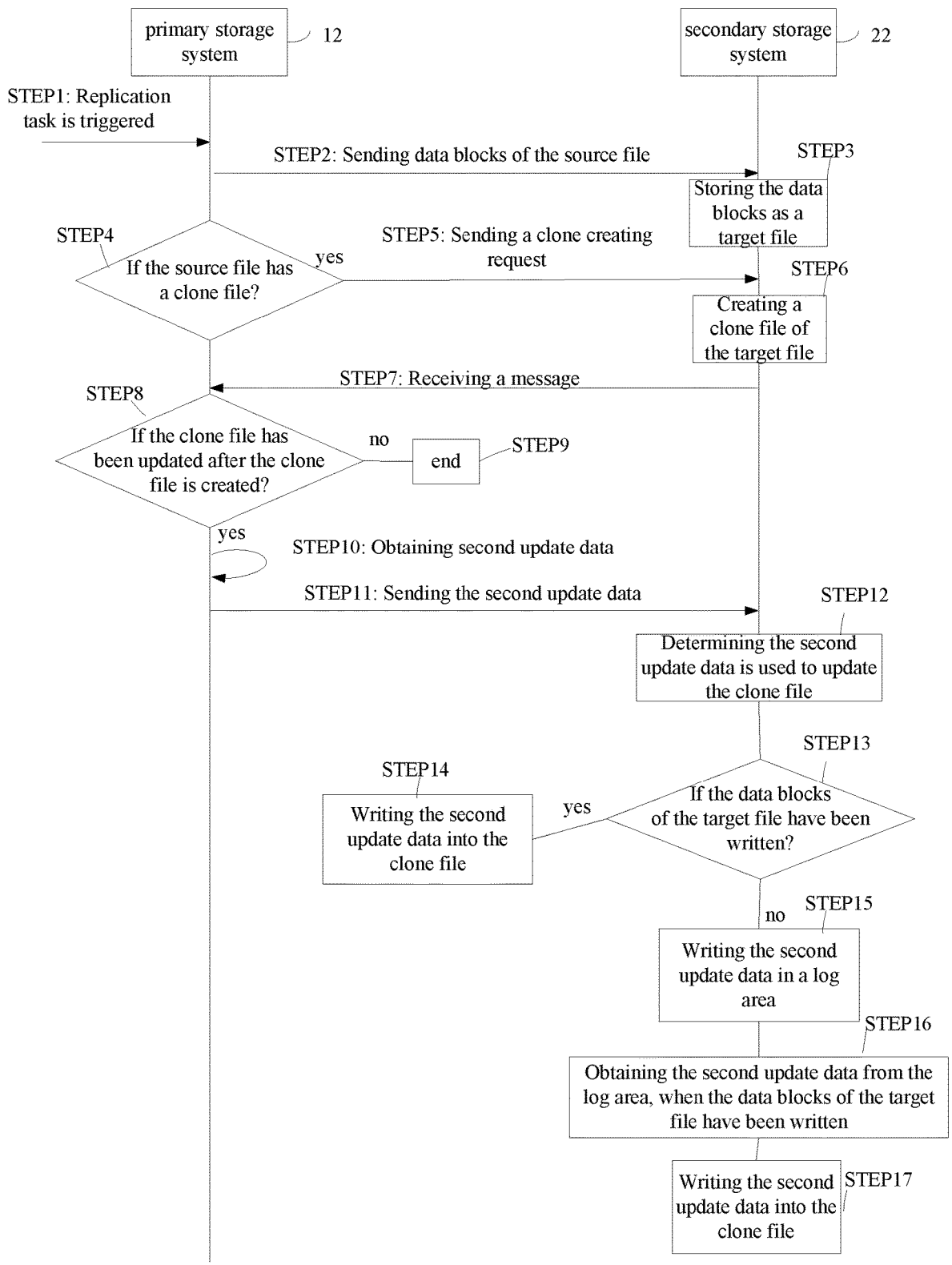
FIG. 8 is a block diagram illustrating a backup processing according to another embodiment of the present disclosure.

As depicted in FIG. 8, the STEPs 1-7 are similar to the STEPs 1-7 of FIG. 7. So the STEPs 1-7 of FIG. 7 are not explained again.

In STEP 8, the replication program 128 determines whether the clone file of the source file has been updated after the clone file being created. Since the cloning recorder 126 has recorded a timestamp indicating when the clone file of the source file is created. The replication program 128 obtains another timestamp from the file system 125 which indicates when the second update data is written in the primary storage system 12. So the replication program 128 can compare the two timestamps to determine whether the clone file of the source file has been updated after the clone file of the source file being created. If no, the process will be end (STEP 9).

On the other hand, if it is determined in STEP 8 that the clone file of the source file has been updated, the replication program 128 obtains the second update data (STEP 10) and sends it to the secondary storage system 22 (STEP 11). The second update data may be included in a replication request which further includes an offset of the second update data within the clone file and a size of the second update data.

Further, in the STEP 11, the replication program 128 may attach an indicator to the second update data to make a distinction between the source file and the second update data. The indicator indicates that the second update data of the clone file is written into the primary storage system 12 (cache memory 123 or the disks) after the clone file of the source file is created.

In STEP 12: After the replication program 228 receives the second update data, it determines the second update data is used to update the clone file of the target file. For example, the replication program 128 may send an update request to the replication program 228. The update request includes the second update data and the ID of the clone file of the source file. Further, the second update data may be attached an indicator (explained in the STEP 11). Based upon the indicator, it is determined by the replication program 228 that the second update data is written into the primary storage system 12 after the clone file of the source file has been created. Further, in an approach, the ID of the clone file of the target file is identical to the ID of the clone file of the source file. The replication program 228 determines that it is the clone file of the target file who needs to be updated by the second update data based upon the ID of the clone file of the source file. In another approach, the ID of the clone file of the target file is different from the ID of the clone file of the source file. The replication program 228 determines that it is the clone file of the target file who needs to be updated by the second update data based upon the ID of the clone file of the source file and the second mapping relationship.

In STEP 13: The replication program 228 determines whether data blocks of the target file have been written into the target file of secondary storage system 22. The STEP is similar to the STEP 13 of FIG. 7, so it is not explained here again.

If the data blocks of the target file have been written into the secondary storage system 22, the replication program 228 can write the second update data into the clone file of the target file directly (STEP 14). Otherwise, the replication program 228 should activate the log program 226 and execute the STEP 15.

In the STEP 15: The log program 226 writes the second update data into the log area. For example, the log program 226 may write the second update data according to the attached indicator.

More specifically, the log program 226 records log of the second update data and write the log into the log area. The log includes the second update data itself. Further, the log includes the ID of the clone file of the target file because the second update data is used to update the clone file. And the log further includes an offset within the clone file and a size of the second update data. Based on the offset and the size, it can be determined which block of the clone file should be replaced by the second update data.

Until determining that the data blocks of the target file have been written into the target file, STEP 15 could be executed. In STEP 16, the log program 226 obtains the second update data from the log area.

In STEP 17, the log program 226 writes the second update data into the target file. And then the data pointer pointing to a replaced block should be redirect to the second update data.

An example depicted in FIG. 4B, the update data E is supposed to replace data block D. Before the A, B, C and D are totally written in the disks, the log program 226 records a log of the update data E. The log of the update data E includes E, an offset within the clone file of the target file (for example, 76) and a size of the update data E (for example, 25 byte). After the A, B, C and D are totally written in the disks, the log program 226 obtains E from the log area and writes it into the disks. Then the log program 226 further determines that which data block of the clone file of the target file should be replaced by the update data E. The log program 226 obtains metadata of the clone file of the target file from the file system 225. The metadata shows that a size of the clone file of the target file is 100 byte. The data block D is located in an address range of 76-100. As such, the log program 226 can determine the data block D should be replaced by the update data E. So the log program 226 redirects the block pointer of D to the update data E.

With regard to the update data of clone file backup processing according to the embodiment, the update data can be sent to the secondary storage device to update the clone file of the target file without changing the target file.

Figure 9:
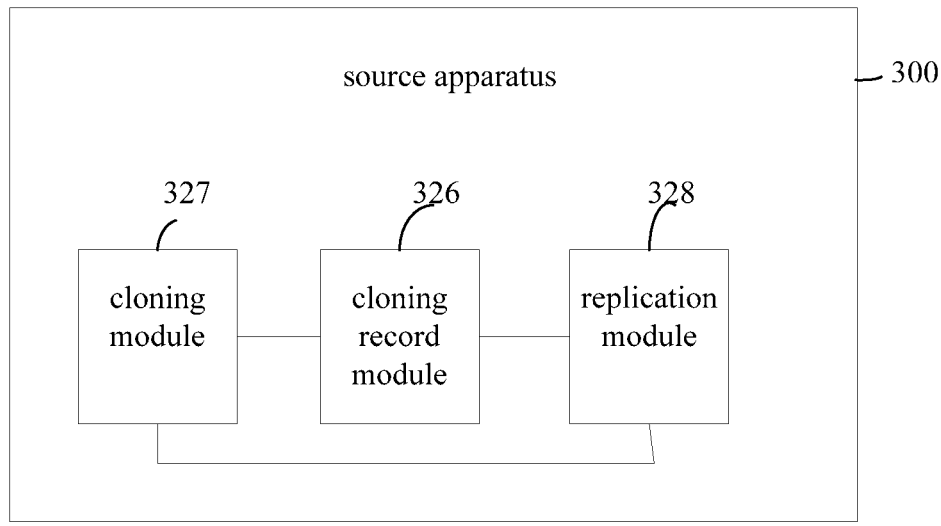
FIG. 9 is a block diagram illustrating a hardware configuration of a source apparatus according to an embodiment of the present disclosure.

(6) A Source Apparatus for Sending a Source File and a Clone File of the Source File to a Backup Storage Device As depicted in FIG. 9, the source apparatus 300 includes a cloning record module 326 and a replication module 328. The operations of cloning record module 326 are similar to the cloning recorder 126 of FIG. 3; and the operations of replication module 328 are similar to the replication program 128 of FIG. 3. Thus, the operations and functions of these modules will not be discussed again.

Further, the source apparatus 300 may further includes a cloning module 327 whose operations are similar to the cloning program 127 of FIG. 3, so it is not discussed again.

Figure 10:
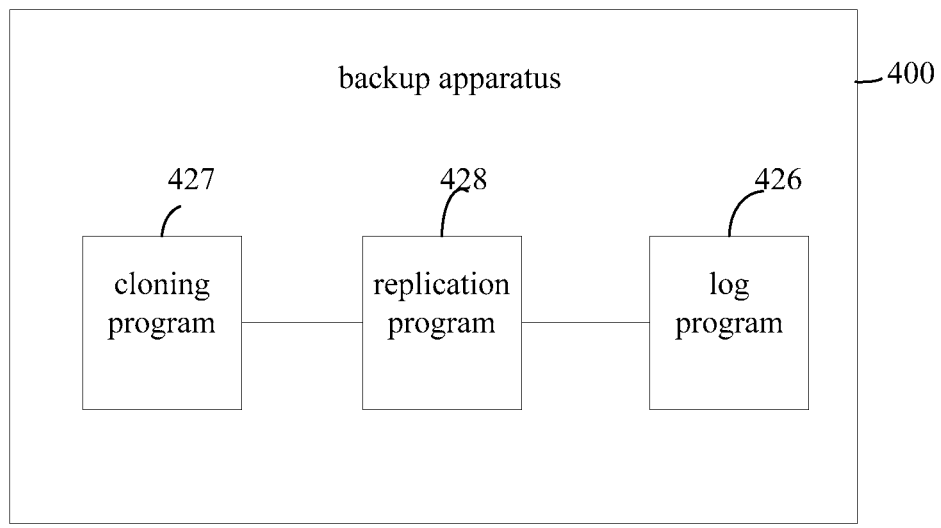
FIG. 10 is a block diagram illustrating a hardware configuration of a backup apparatus according to an embodiment of the present disclosure.

(7) A Backup Apparatus for Backing Up a Source File and a Clone File of the Source File As depicted in FIG. 10, the backup apparatus 400 includes a cloning module 427, and a replication module 428. The operations of cloning module 427 are similar to the cloning program 227 of FIG. 5; and the operations of replication module 428 are similar to the replication program 228 of FIG. 5. Thus, the operations and functions of these modules will not be discussed.

Further, the backup apparatus 400 may further include a log module 426 whose operations are similar to the log program 226 of FIG. 5, so it is not discussed again.

What is claimed is:

1. A method for a source storage device to send data to a backup storage device, the method comprising:
   sending, by a processor included in the source storage device, a data block to the backup storage device to be stored as a target file, wherein the source storage device includes the processor and one or more disks for storing files, a source file includes the data block and a first block pointer pointing to the data block, and a clone file of the source file includes a second block pointer pointing to the data block;
   determining, by the processor included in the source storage device, that the source file is associated with the clone file by searching a cloning recorder with a source file ID of the source file, wherein the cloning recorder includes IDs of files each associated with an ID of a corresponding clone file;
   based upon the determining, sending, by the processor included in the source storage device, a clone creating request including the source file ID and an ID of the clone file of the source file to the backup storage device to instruct the backup storage device to create a clone file of the target file;
   receiving, by the processor included in the source storage device, a message in response to the clone creating request, wherein the message includes an ID of the clone file of the target file, and wherein the ID of the clone file of the target file is identical to the ID of clone file of the source file;
   determining, by the processor included in the source storage device, that the source file has been updated after the clone file of the source file is created, wherein first update data is used to update the source file and is written into the source storage device after the clone file of the source file in the source storage device is created; and
   after receiving the message in response to the clone creating request, sending, by the processor included in the source storage device, the first update data to the backup storage device to be stored on the backup storage device, wherein sending the first update data to the backup storage device causes the backup storage device to:
      record, by a log program, a log of the first update data and write the log into a log area, wherein the log includes an offset within the target file and a size of the first update data;
      based on the offset within the target file and the size of the first update data, determine which block of the target file corresponds to a block to be replaced by the first update data; and
      redirect a data pointer pointing to the block to be replaced to a block corresponding to the first update data stored on backup storage device.

2. The method according to claim 1, wherein the cloning recorder further includes a timestamp of creating the clone file of the source file;
   wherein the step of determining that the source file has been updated after the clone file of the source file is created comprises:

identifying a timestamp of writing the first update data into the source storage device; and determining that the timestamp of creating the clone file of the source file is previous to the timestamp of writing the first update data.

3. The method according to claim 1, further comprising:
attaching a first indicator to the first update data, wherein the first indicator indicates that the first update data is written into the source storage device after the clone file of the source file is created.

4. The method according to claim 1, further comprising:
determining that the clone file of the source file has been updated after the clone file of the source file is created; and sending second update data to the backup storage device after receiving the message, wherein the second update data which is used to update the clone file of the source file is written into the source storage device after the clone file of the source file in the source storage device is created.

5. The method according to claim 4, wherein the cloning recorder further includes a timestamp of creating the clone file of the source file;

wherein the step of determining that the clone file of the source file has been updated after the clone file of the source file is created comprises:

identifying a timestamp of writing the second update data into the source storage device; and determining that the timestamp of creating the clone file of the source file is previous to the timestamp of writing the second update data.

6. The method according to claim 4, further comprising:
attaching a second indicator to the second update data, wherein the second indicator indicates that the second update data is written into the source storage device after the clone file of the source file is created.

7. A method for a backup storage device to backup a source file and a clone file of the source file, the method comprising:

receiving, by a processor included in the backup storage device, a data block of the source file from a source storage device, wherein the backup storage device includes the processor and one or more disks for storing a plurality of files;

storing, by the processor included in the backup storage device, the data block as part of a target file, wherein the target file includes a first block pointer pointing to the data block;

receiving, by the processor included in the backup storage device from the source storage device, a clone creating request including a source file ID of the source file and an ID of the clone file of the source file;

allocating, by the processor included in the backup storage device, a target file ID for the target file, wherein the target file ID is identical to the source file ID;

creating, by the processor included in the backup storage device, a clone file of the target file based upon the source file ID, wherein the clone file of the target file includes a second block pointer pointing to the data block, wherein the step of creating the clone file of the target file based upon the source file ID comprises:

determining that the clone file of the target file needs to be created based on the source file ID; and creating the clone file of the target file; and allocating an ID of the clone file of the target file, wherein the ID of the clone file of the target file is identical to the ID of the clone file of the source file.

8. The method according to claim 7, wherein the backup storage device further includes a log area; the method further comprising:

receiving first update data and the source file ID from the source storage device;

determining that the first update data is used to update the target file based upon the source file ID, wherein the first update data is written into the source storage device after the clone file of the source file in the source storage device is created;

writing the first update data into the log area;

determining that the data block has been written into the target file;

based upon the determination, obtaining the first update data from the log area;

writing the first update data into the target file; and modifying the second block pointer to point to the first update data.

9. The method according to claim 8, wherein the first update data is attached a first update indicator that indicates that the first update data is written into the source storage device after the clone file of the source file is created.

10. The method according to claim 7, wherein the backup storage device further includes a log area; the method further comprising:

receiving second update data and the ID of the clone file of the source file from the source storage device;

determining that the second update data is used to update the clone file of the target file based upon the ID of the clone file of the source file, wherein the second update data is written into the source storage device after the clone file of the source file in the source storage device is created;

writing the second update data into the log area;

determining that the data block has been written into the target file;

based upon the determination, obtaining the second update data from the log area;

writing the second update data into the clone file of the target file; and modifying the second block pointer to point to the second update data.

11. The method according to claim 10, wherein the second update data is attached a second update indicator that indicates that the second update data is written into the source storage device after the clone file of the source file is created.

12. The method according to claim 7, further comprising:
receiving the source file ID from the source storage device;

allocating a target file ID for the target file, wherein the target file ID is different from the source file ID; and storing a first mapping relationship between the source file ID and the target file ID;

wherein the step of creating the clone file of the target file based upon the source file ID comprises:

determining that the clone file of the target file needs to be created based on the source file ID and the first mapping relationship; and creating the clone file of the target file.

13. The method according to claim 12, wherein the backup storage device further includes a log area; the method further comprising:

receiving first update data and the source file ID from the source storage device;

determining that the first update data is used to update the target file based upon the source file ID and the first mapping relationship, wherein the first update data is written into the source storage device after the clone file of the source file in the source storage device is created;
writing the first update data of the target file into the log area;
determining that the data block has been written into the target file;
based upon the determination, obtaining the first update data from the log area;
writing the first update data into the target file; and
modifying the second block pointer to point to the first update data.

14. The method according to claim 13, wherein the first update data is attached a first update indicator that indicates that the first update data is written into the source storage device after the clone file of the source file is created.

15. The method according to claim 12, wherein the clone creating request further includes an ID of a clone file of the source file; and the method further comprising:
allocating an ID of the clone file of the target file, which is different from the ID of the clone file of the source file; and
storing a second mapping relationship between the ID of the clone file of the source file and the ID of the clone file of the target file.

16. The method according to claim 15, wherein the backup storage device further includes a log area; the method further comprising:
receiving second update data and the ID of the clone file of the source file from the source storage device;
determining that the second update data is used to update the clone file of the target file based upon the ID of the clone file of the source file and the second mapping relationship, wherein the second update data is written into the source storage device after the clone file of the source file in the source storage device is created;
writing the second update data of the clone file of the target file into the log area;
determining that the data block has been written into the target file;
based upon the determination, obtaining the second update data from the log area;
writing the second update data into the clone file of the target file; and
modifying the second block pointer to point to the second update data.

17. The method according to claim 16, wherein the second update data is attached a second update indicator that indicates that the second update data is written into the source storage device after the clone file of the source file is created.

18. A source storage device for sending data to a backup storage device, the source storage device comprising:
one or more disks for storing files, wherein a source file includes a data block and a first block pointer pointing to the data block, and a clone file of the source file includes a second block pointer pointing to the data block; and
a processor configured to:
send the data block to the backup storage device to be stored as a target file;
determine that the source file is associated with the clone file by searching a cloning recorder with a source file ID of the source file, wherein the cloning recorder includes IDs of files each associated with an ID of a corresponding clone file;
based upon the determining, send a clone creating request including the source file ID and an ID of the clone file of the source file to the backup storage device to instruct the backup storage device to create a clone file of the target file;
receive a message in response to the clone creating request, wherein the message includes an ID of the clone file of the target file, and wherein the ID of the clone file of the target file is identical to the ID of clone file of the source file;
determine that the source file has been updated after the clone file of the source file is created, wherein first update data is used to update the source file and is written into the source storage device after the clone file of the source file in the source storage device is created; and
after receiving the message in response to the clone creating request, send the first update data to the backup storage device to be stored on the backup storage device, wherein sending the first update data to the backup storage device causes the backup storage device to:
record, by a log program, a log of the first update data and write the log into a log area, wherein the log includes an offset within the target file and a size of the first update data;
based on the offset within the target file and the size of the first update data, determine which block of the target file corresponds to a block to be replaced by the first update data; and
redirect a data pointer pointing to the block to be replaced to a block corresponding to the first update data stored on backup storage device.

19. The source storage device according to the claim 18, wherein:
the cloning recorder further includes a timestamp of creating the clone file of the source file; and
the processor is configured to:
identify a timestamp of writing the first update data into the source storage device; and
determine that the timestamp of creating the clone file of the source file is previous to the timestamp of writing the first update data.

20. The source storage device according to the claim 18, wherein the processor is further configured to:
determine that the clone file of the source file has been updated after the clone file of the source file is created; and
send second update data to the backup storage device after receiving the message, wherein the second update data which is used to update the clone file of the source file is written into the source storage device after the clone file of the source file in the source storage device is created.

21. The source storage device according to the claim 20, wherein:
the cloning recorder further includes a timestamp of creating the clone file of the source file; and
the processor is configured to:
identify a timestamp of writing the second update data into the source storage device; and
determine that the timestamp of creating the clone file of the source file is previous to the timestamp of writing the second update data.

22. A backup storage device for backing up a source file and a clone file of the source file, the backup storage device comprising:

one or more disks for storing a plurality of files; and
a processor configured to:
receive a data block of the source file from the source storage device;
store the data block as part of a target file, wherein the target file includes a first block pointer pointing to the data block;
receive, from the source storage device, a clone creating request including a source file ID of the source file and an ID of the clone file of the source file;
allocate a target file ID for the target file, wherein the target file ID is identical to the source file ID;
create a clone file of the target file based upon the source file ID, wherein the clone file of the target file includes a second block pointer pointing to the data block, wherein creating the clone file of the target file based upon the source file ID comprises:
determining that the clone file of the target file needs to be created based on the source file ID; and
creating the clone file of the target file; and
allocate an ID of the clone file of the target file, wherein the ID of the clone file of the target file is identical to the ID of the clone file of the source file.

23. The backup storage device according to claim 22, wherein the backup storage device further includes a log area; and the processor is further configured to:
receive first update data and the source file ID from the source storage device;
determine that the first update data is used to update the target file based upon the source file ID, wherein the first update data is written into the source storage device after the clone file of the source file in the source storage device is created;
write the first update data into the log area;
determine that the data block has been written into the target file;
based upon the determination, obtain the first update data from the log area;
write the first update data into the target file; and
modify the second block pointer to point to the first update data.

24. The backup storage device according to claim 22, wherein the backup storage device further includes a log area; and the processor is further configured to:
receive second update data and the ID of the clone file of the source file from the source storage device;
determine that the second update data is used to update the clone file of the target file based upon the ID of the clone file of the source file, wherein the second update data is written into the source storage device after the clone file of the source file in the source storage device is created;
write the second update data into the log area;
determine that the data block has been written into the target file;
based upon the determination, obtain the second update data from the log area;
write the second update data into the clone file of the target file; and
modify the second block pointer to point to the second update data.

25. The backup storage device according to claim 22, wherein the processor is further configured to:
receive the source file ID from the source storage device;
allocate a target file ID for the target file, wherein the target file ID is different from the source file ID;
store a first mapping relationship between the source file ID and the target file ID;
determine that is the clone file of the target file needs to be created based on the source file ID and the first mapping relationship; and
create the clone file of the target file.

26. The backup storage device according to claim 25, wherein the backup storage device further includes a log area; and the processor is further configured to:
receive first update data and the source file ID from the source storage device;
determine that the first update data is used to update the target file based upon the source file ID and the first mapping relationship, wherein the first update data is written into the source storage device after the clone file of the source file in the source storage device is created;
write the first update data of the target file into the log area;
determine that the data block has been written into the target file;
based upon the determination, obtain the first update data from the log area;
write the first update data into the target file; and
modify the second block pointer to point to the first update data.

27. The backup storage device according to claim 25, wherein the clone creating request further includes an ID of a clone file of the source file; and the processor is further configured to:
allocate an ID of the clone file of the target file, which is different from the ID of the clone file of the source file; and
store a second mapping relationship between the ID of the clone file of the source file and the ID of the clone file of the target file.

28. The backup storage device according to claim 27, wherein the backup storage device further includes a log area; and wherein the processor is further configured to:
receive second update data and the ID of the clone file of the source file from the source storage device;
determine that the second update data is used to update the clone file of the target file based upon the ID of the clone file of the source file and the second mapping relationship, wherein the second update data is written into the source storage device after the clone file of the source file in the source storage device is created;
write the second update data of the clone file of the target file into the log area;
determine that the data block has been written into the target file;
based upon the determination, obtain the second update data from the log area;
write the second update data into the clone file of the target file; and
modify the second block pointer to point to the second update data.

* * * * *